US007102701B2

(12) United States Patent
Kawase

(10) Patent No.: US 7,102,701 B2
(45) Date of Patent: Sep. 5, 2006

(54) DISPLAY DEVICE

(75) Inventor: Toshimitsu Kawase, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 537 days.

(21) Appl. No.: 10/305,944

(22) Filed: Nov. 29, 2002

(65) Prior Publication Data

US 2003/0122472 A1 Jul. 3, 2003

(30) Foreign Application Priority Data

Dec. 27, 2001 (JP) ............................ 2001-396658
Dec. 27, 2001 (JP) ............................ 2001-396659
Dec. 27, 2001 (JP) ............................ 2001-396660

(51) Int. Cl.
*H04N 9/12* (2006.01)
*H01J 1/62* (2006.01)
*H01J 63/04* (2006.01)

(52) U.S. Cl. ..................... 348/796; 313/496; 313/497; 313/495

(58) Field of Classification Search ................ 348/825, 348/826, 827; 313/422, 496, 495, 497, 493; 439/865, 521; H04N 9/12
See application file for complete search history.

(56) References Cited

U.S. PATENT DOCUMENTS

| | | | | |
|---|---|---|---|---|
| 5,096,445 | A * | 3/1992 | Lostumo | 439/865 |
| 5,407,370 | A | 4/1995 | Lostumo | 439/854 |
| 5,583,392 | A | 12/1996 | Wada et al. | 313/477 |
| 6,114,804 | A * | 9/2000 | Kawase et al. | 313/495 |
| 6,169,356 | B1 | 1/2001 | Ohnishi et al. | 313/495 |
| 6,288,759 | B1 | 9/2001 | Cho et al. | 348/836 |
| 6,476,547 | B1 | 11/2002 | Kawase | 313/495 |
| 6,528,939 | B1 | 3/2003 | Kawase | 313/495 |
| 6,603,255 | B1 * | 8/2003 | Takahashi | 313/496 |
| 6,787,983 | B1 * | 9/2004 | Yamanobe et al. | 313/495 |
| 6,879,096 | B1 | 4/2005 | Miyazaki et al. | 313/495 |
| 6,885,156 | B1 * | 4/2005 | Tajima et al. | 315/169.3 |
| 2002/0021081 | A1 | 2/2002 | Tajima et al. | 313/495 |

FOREIGN PATENT DOCUMENTS

| | | |
|---|---|---|
| JP | 4-163833 | 6/1992 |
| JP | 7-235255 | 9/1995 |
| JP | 8-287851 | 11/1996 |
| JP | 10-326581 | 12/1998 |
| JP | 2000-195449 | 7/2000 |

(Continued)

*Primary Examiner*—Michael H. Lee
(74) *Attorney, Agent, or Firm*—Fitzpatrick, Cella, Harper & Scinto

(57) ABSTRACT

A display device equipped with a display unit for displaying information includes a terminal connected to the display unit and adapted to supply a predetermined potential to an electrode in the display unit, an insulator provided outside the display unit and adapted to cover the terminal, and a support structure for supporting the display unit, the display device characterized by having one of the following features (1) The support structure is equipped with a retaining portion for retaining the insulator independently of the support of the display unit.
(2) It is equipped with a guide for guiding the conductor cable along the conductor cable between the terminal and the power source.
(3) At least a part of the drive circuit is arranged such that the orthogonal projection thereof on a predetermined surface of the display unit overlaps the terminal, and in the portion where the drive circuit and the terminal overlap each other, a conductor to which a reference potential lower than the predetermined potential is imparted is provided between the drive circuit and the terminal such that it is insulated from each of the drive circuit and the terminal.

13 Claims, 7 Drawing Sheets

FOREIGN PATENT DOCUMENTS

| | | |
|---|---|---|
| JP | 2000-251786 | 9/2000 |
| JP | 2000-260359 | 9/2000 |
| WO | 00/54307 | 9/2000 |

* cited by examiner

DISPLAY DEVICE

BACKGROUND OF THE INVENTION

1. Field of the Invention

The present invention relates to a display device equipped with a display unit for displaying information such as characters and images.

2. Related Background Art

As a display device displaying information such as images by utilizing an electron beam, a device of a construction which uses a CRT (Cathode-ray Tube) as the display unit has been widely used. To generate an electron beam, a CRT of this type adopts a structure capable of supplying a high voltage of several tens of kV. Voltage is supplied to the cathode-ray tube by using an anode cap so that electrical discharge or the like may not occur. As shown in, for example, Japanese Patent Application Laid-Open No. 8-287851, a round insulating cap is used.

It is desired that the display unit is thin. Further, it is desired that not only its front surface but also its back surface is substantially flat, with the front and back surfaces being substantially parallel to each other. Recently, a thin, flat display device using liquid crystal has come into widespread use in place of the CRT. However, a display device using liquid crystal has a problem in that it has to be equipped with a back light since liquid crystal is not of a so-called self-luminous nature. Thus, there has been a demand for development of a self-luminous type display device.

As self-luminous type display devices, plasma displays have recently been commercialized. They are all thin and of large-screen type, commercially showing great promise. Further, parallel to the plasma displays, there exists a promising technique according to which a plurality of electron-emitting devices are arranged and applied to a flat display device, thereby obtaining a light emission of the same quality as that of the CRT. A number of proposals have been made regarding this technique. For example, Japanese Patent Application Laid-Open No. 4-163833 discloses a flat electron beam display device in which a vacuum panel contains a linear hot cathode and a complicated electrode structure. Known examples of the electron-emitting devices include a field emission device using an emitter cone, and a surface conduction electron-emitting device. Display devices using such electron devices are being studied.

Generally known examples of the construction of such a vacuum panel include one in which an electron source formed by arranging a plurality of electron-emitting devices in a matrix, a rear plate of glass on which drive wiring for driving the electron source is formed in a matrix, and a face plate of glass on which an accelerating electrode and phosphor are formed, are hermetically sealed by a seal bonding material through the intermediation of frames, and one in which hermetic sealing is effected solely by a seal bonding material when the gap between the face plate and the rear plate is small. In such a display device, display is effected by supplying various signal potentials to the display unit.

For example, in a CRT, there are supplied a potential for generating voltage for effecting electron emission from the electron-emitting device (electron gun), an anode potential, etc. In a plasma display panel, there is supplied a potential for generating voltage for generating plasma. In a flat panel display, in which electrons are emitted from electron-emitting devices arranged in a matrix to display an image or the like, there are supplied a potential for driving the matrix, a potential for accelerating electrons, etc.

Here, in a display device, by covering the terminal for supplying potential to the display unit with an insulator, it is possible to restrain the bad effect of the terminal potential on the other portions in the display device.

In a CRT, for example, an arrangement is known in which an anode potential of not less than 10 kV is used. In a display unit of the type in which a plurality of electron-emitting devices are dispersed in a plane and in which each electron-emitting device is independently driven, it is preferable to use an acceleration potential of not less than 700 V in the case of a so-called low-voltage drive type display unit and an acceleration potential of not less than 1 kV, more preferably, not less than 5 kV in the case of a high-voltage drive type display unit.

When using such a high potential, an arrangement is preferably adopted in which the potential supply terminal is covered with an insulator as in the case of a CRT, which uses an anode cap.

In order to realize a preferable insulator retaining construction for the case in which the terminal is covered with an insulator, the present inventor has conducted a study so as to develop a construction in which the insulator is directly attached to the display unit, with the insulator being retained solely by the attachment.

However, in this construction, it is necessary to firmly secure the display unit in position in order to reliably retain the insulator. Further, it is necessary to ensure a sufficient strength for the insulator. As the strength of the insulator increases, the size of the insulator also increases, so that it is rather difficult to achieve a reduction in the size of the entire display device (problem 1).

Further, in order to supply high potential to the terminal, a power source and a conductor cable for electrically connecting the power source and the terminal are used. In this case, in securing the conductor cable in position, fixing the conductor cable only at a predetermined position results in movement of the conductor cable caused on one side of that fixing point causing a movement in the reverse direction on the other side. Then, if a force is applied to the conductor cable as a result of vibration, shock, and interference with other components during transportation, a force is also applied to the terminal, so that there is the danger of the terminal being damaged (problem 2).

In a display device, there is provided not only a display unit but also drive circuits for driving the display unit. The drive circuits include a circuit for generating a signal to be supplied to the display unit, and a circuit for converting a signal input from the exterior of the display device into a signal suited to be supplied to the display unit. A signal for driving the display device is input and/or output to and/or from each of these circuits.

From the viewpoint of safety, reliability, and restraining of electromagnetic interference, these drive circuits must be protected from high voltage (problem 3).

SUMMARY OF THE INVENTION

It is a first object of the present invention to provide a display device capable of reliably regulating the position of the insulator and reduced in size and thickness.

It is a second object of the present invention to provide a display device in which the conductor cable for electrically connecting the power source and the terminal does not adversely affect other components.

It is a third object of the present invention to provide a display device in which the degree of freedom in terms of the circuit arrangement position has been increased in order to achieve a reduction in the size and thickness of the entire display device.

According to a gist of the present invention, there is provided a display device equipped with a flat display unit containing an electron-emitting device, an anode electrode to which an acceleration potential for accelerating electrons emitted from the electron-emitting device is imparted, and a luminous element adapted to emit light when the electrons emitted from the electron-emitting device hit the same, the display device including:

an anode terminal for imparting the acceleration potential to the anode electrode;

an anode cap provided on the rear surface of the display unit and consisting of an insulator for covering the anode terminal; and a frame for supporting the display unit, characterized in that the frame is equipped with a retaining portion for retaining the anode cap independently of the support of the display unit.

In the display device of the present invention, it is preferable that the retaining portion is formed as a separate portion detachable from the frame.

Further, in the display device of the present invention, it is preferable that the anode terminal protrudes from the rear surface of the display unit.

Further, in the display device of the present invention, it is preferable that the retaining portion is provided so as to urge the anode cap toward the display unit.

According to another gist of the present invention, there is provided a display device equipped with a display unit for displaying information, including:

a terminal connected to the display unit and adapted to supply a predetermined potential to an electrode in the display unit;

an insulator provided outside the display unit and adapted to cover the terminal; and a support structure for supporting the display unit, characterized in that the support structure is equipped with a retaining portion for retaining the insulator independently of the support of the display unit.

According to yet another gist of the present invention, there is provided a display device equipped with a flat display unit containing an electron-emitting device, an anode electrode to which an acceleration potential for accelerating electrons emitted from the electron-emitting device is imparted, and a luminous element adapted to emit light when the electrons emitted from the electron-emitting device hit the same, the display device characterized by including:

an anode terminal for imparting the acceleration potential to the anode electrode;

an anode power source for generating the acceleration potential to be imparted to the anode terminal through a conductor cable; and a guide structure for guiding the conductor cable along the conductor cable between the anode terminal and the anode power source.

In the display device of the present invention, it is preferable that the guide has a bending portion for bending the conductor cable.

Further, in the display device of the present invention, it is preferable that the anode terminal protrudes from the rear surface of the display unit.

According to another gist of the present invention, there is provided a display device equipped with a display unit for displaying information, characterized by including:

a terminal connected to the display unit and adapted to supply a predetermined potential to an electrode in the display unit;

a power source for generating the predetermined potential to be imparted to the terminal through a conductor cable; and a guide for guiding the conductor cable along the conductor cable between the terminal and the power source.

Preferably, the display device according to the present invention further includes:

an insulator provided outside the display unit and adapted to cover the terminal; and a support structure for supporting the display unit, in which the support structure is equipped with a retaining portion for retaining the insulator independently of the support of the display unit.

According to yet another gist of the present invention, there is provided a display device equipped with a flat display unit containing an electron-emitting device, an anode electrode to which an acceleration potential for accelerating electrons emitted from the electron-emitting device is imparted, and a luminous element adapted to emit light when the electrons emitted from the electron-emitting device hit the same, the display device including:

an anode terminal for imparting the acceleration potential to the anode electrode;

an anode cap provided on the rear surface of the display unit and consisting of an insulator for covering the anode terminal; and a drive circuit for outputting a signal for driving the display unit, characterized in that at least a part of the drive circuit is arranged such that its orthogonal projection on the rear surface of the display unit overlaps at least a part of the anode terminal, and that in the portion where the drive circuit and the anode terminal overlap each other, a conductor to which a reference potential lower than the acceleration potential is imparted is provided between the drive circuit and the anode terminal such that it is insulated from each of the drive circuit and the anode terminal.

According to still another gist of the present invention, there is provided a display device equipped with a display unit for displaying information, including:

a terminal connected to the display unit and adapted to supply a predetermined potential to an electrode in the display unit;

an insulator provided outside the display unit and adapted to cover the terminal; and a drive circuit for outputting a signal for driving the display unit, characterized in that a first portion constituting at least a part of the drive circuit is arranged such that the orthogonal projection of the first portion on a predetermined surface of the display unit overlaps at least a part of the terminal, and that in the portion where the drive circuit and the terminal overlap each other, a conductor to which a reference potential lower than the predetermined potential is imparted is provided between the drive circuit and the terminal such that it is insulated from each of the drive circuit and the terminal.

In the display device of the present invention, it is preferable that the conductor is a metal plate, and that the insulator is covered with the conductor.

According to still another gist of the present invention, there is provided a display device equipped with a flat display unit containing an electron-emitting device, an anode electrode to which an acceleration potential for accelerating electrons emitted from the electron-emitting device is imparted, and a luminous element adapted to emit light when the electrons emitted from the electron-emitting device hit the same, the display device including:

an anode terminal for imparting the acceleration potential to the anode electrode;

an anode terminal connecting portion including an anode cap provided on the rear surface of the display unit and consisting of an insulator for covering the anode terminal, and a cable having a conductor connected to the anode terminal to which the anode cap is attached; and a frame for supporting the display unit, characterized in that the frame is equipped with a regulating member for regulating the movement of the anode terminal connecting portion.

In the display device constructed as described above, the insulator is retained by the retaining portion of the support structure, whereby it is possible to restrain positional deviation of the insulator with respect to the in-plane directions and plane-normal direction of the display unit.

Further, in this display device, the support structure for supporting the display unit is provided with a retaining portion for retaining the insulator, whereby there is no need to firmly fix the insulator to the display unit. Further, the insulator is supported by the support structure, whereby the strength level required of the insulator itself is reduced.

Further, in the display device of the present invention, it is possible to suitably adopt an arrangement in which the support portion is formed separately from the support structure and mounted to the support structure. It is also possible for the retaining portion to be formed integrally with the support structure so that a part of the support structure may also serve as the retaining portion. For example; by forming a part of the support structure in a configuration allowing retention of the insulator, it is possible to realize retention of the insulator by the support structure.

Further, in the display device of the present invention, it is desirable that the predetermined position where the terminal is connected to the display unit be on the rear side of the display unit. In particular, it is desirable that the retaining portion be provided on the support structure situated on the rear side of the display unit. Further, the acceleration potential may be no less than 700 V.

Further, in the display device of the present invention, it is desirable that the retaining portion be provided so as to urge the insulator toward the display unit. This makes it possible to regulate the position of the insulator with respect to the display unit.

In particular, in a display unit whose front and rear surfaces are substantially flat and substantially parallel to each other, it is desirable that the components situated on the rear side of the display unit be as small as possible. In such cases, the present invention is suitably applicable.

The display device of the present invention constructed as described above has a guide for guiding the conductor cable connecting the terminal and the power source along the conductor cable, whereby if an external force is applied to the conductor cable, no movement or deformation of the conductor cable is caused, so that no force adversely affecting the terminal is applied. Further, since it is a guide along the conductor cable, it is also capable of preventing interference of the conductor cable with other components.

It is desirable that the guide of the display device of the present invention have a bending portion bending the conductor cable. In this case, it is possible to ease the force generated between the conductor cable and the component to which it is connected (the terminal, power source, etc.) as a result of the bending of the conductor cable. Further, the acceleration potential may be not less than 700 V.

Further, in the display device of the present invention, it is desirable that the predetermined position where the terminal is connected to the display unit be on the rear side of the display unit.

In particular, in a display unit whose front and rear surfaces are substantially flat and substantially parallel to each other, it is desirable that the components situated on the rear side of the display unit be as small as possible. In such cases, the present invention is suitably applicable.

In particular, when the power source is arranged on the rear side of the display unit, it is possible to make the display device compact. In this case, the routing space for the conductor cable is greatly limited, so that the present invention is suitably applicable. When the front and rear surfaces of the display unit are both substantially flat and substantially parallel to each other, an especially compact arrangement is desired on the rear side, and the limitation of the routing space for the conductor cable is particularly great, so that the present invention is particularly applicable.

In the display device of the present invention constructed as described above, it is possible to arrange the terminal and the circuits such that they are superimposed one upon the other. This is due to the fact that the terminal is covered with the insulator and that there is provided between the insulator and the circuits a conductor to which a potential lower than that supplied to the terminal is imparted, thereby mitigating the influence of the terminal potential on the circuits.

Further, the conductor of the display device of the present invention is electrically connected to the ground.

Further, a predetermined surface of the display device of the present invention may constitute the rear surface of the display unit. In this case, it is possible to arrange the terminal and the circuits such that they are superimposed one upon the other, so that it is possible to make the entire display device particularly compact. Further, the acceleration potential may be not less than 700 V.

In the aspects of the invention described above, the conductor preferably consists of a metal plate. Further, it is also possible to adopt an arrangement in which the conductor covers the insulator.

In particular, in a display unit whose front and rear surfaces are substantially flat and substantially parallel to each other, it is desirable that the components situated on the rear side of the display unit be as small as possible. In such cases, the present invention is suitably applicable.

It is to be noted that the present invention is not restricted to a device using an electron-emitting device. For example, it is also applicable to an EL panel which performs image display by using a plasma display panel or electroluminescence. In particular, it is suitably applicable to, for example, an electron-emitting display device having a common anode electrode, and an EL display device or liquid crystal display device of active matrix type having a common electrode. In the case of an active matrix type display device, the present invention is applicable to the construction for imparting a common potential to a common electrode.

DESCRIPTION OF THE PREFERRED EMBODIMENTS

Next, embodiments of the present invention will be described with reference to the drawings.

First Embodiment

Figure 1:
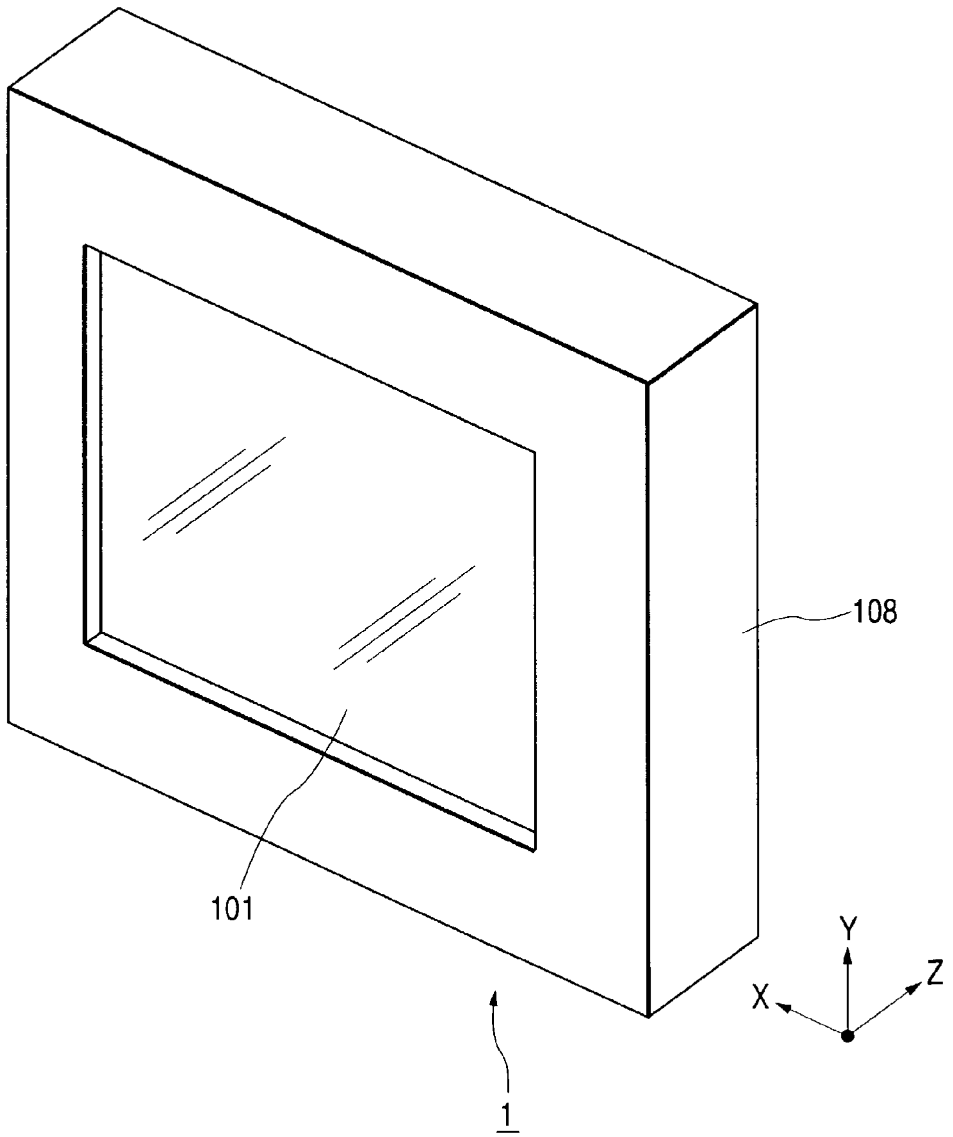
FIG. 1 is a schematic outward perspective view of a display device according to a first embodiment of the present invention.
Figure 2:
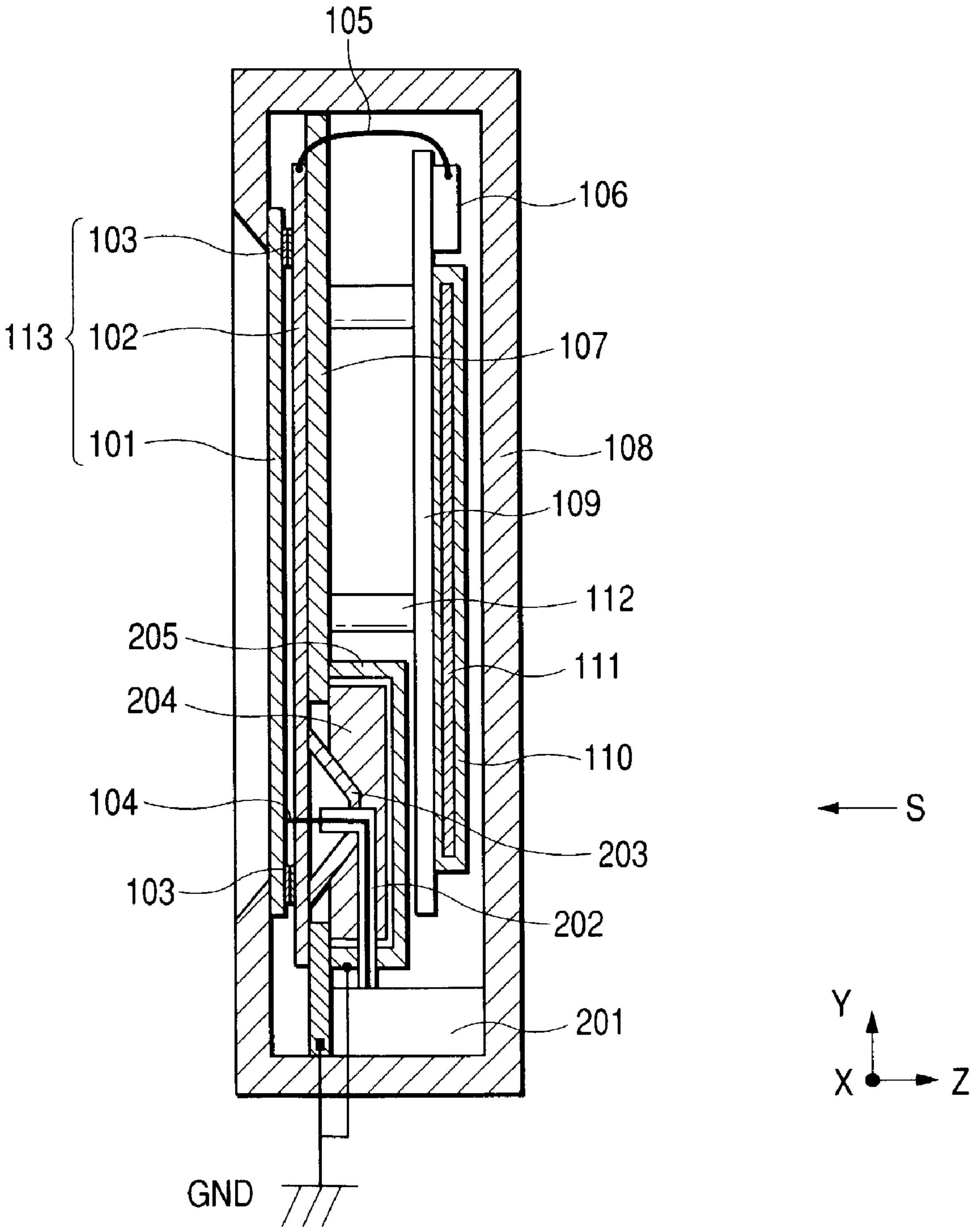
FIG. 2 is a side sectional view of the display device shown in FIG. 1.

FIG. 1 is a schematic outward perspective view of a display device according to a first embodiment. FIG. 2 is a side sectional view of the display device of FIG. 1 as seen from the direction of arrow X of FIG. 1.

In a display device 1, a face plate 101 on which an image or the like is displayed is arranged in the front surface constituting the opening of a cover 108 formed of engineering plastic or the like.

The face plate 101 has a display member consisting of a phosphor which is caused to emit light by electrons emitted from an electron source. It is formed of a high strain point glass material or the like. A rear plate 102 also serves as a substrate for forming an electron source, and surface conduction electron-emitting devices as disclosed in Japanese Patent Application Laid-Open No. 7-235255 are arranged thereon in a matrix. Further, the rear plate 102 is equipped with an anode electrode to which an acceleration potential for accelerating the electrons emitted from the electron-emitting devices is supplied. An acceleration potential of not less than 700 V is supplied to the anode electrode. The base material of the rear plate 102 is preferably the same glass material as that of the face plate 101.

An outer frame 103 consists of glass or the like and is formed into a frame for regulating the distance between the face plate 101 and the rear plate 102. To maintain a vacuum in the space defined by the face plate 101, the rear plate 102, and the outer frame 103, glass frit serving as a sealing material is previously arranged between the contact surfaces of the outer frame 103, the face plate 101, and the rear plate 102, and adhesion fixation is effected through heating.

The face plate 101, the rear plate 102, and the outer frame 103 form a display unit (display panel) 113 whose front and rear surfaces are substantially parallel to each other. This display unit 113 is fixed to a support plate 107 by means of an adhesive material such as adhesive double coated tape. The support plate 107 is a support structure obtained through forming of a rigid material such as aluminum by press working. The support plate 107 is electrically grounded.

In order that a plurality of electron-emitting devices formed in a matrix may be driven according to purposes, the rear plate 102 is equipped with scanning wiring and modulation driving wiring (not shown). The respective ends of the scanning wiring and the modulation driving wiring constitute the lead portions (lead wiring) for receiving signals supplied from outside.

An FPC (flexible printed cable) 105 is connected to the modulation driving lead wiring by a well-known heat sealing method; it is mainly formed of a polyimide material and exhibits flexibility.

Mounted on a circuit board 109 are electric circuits such as a modulation driver circuit 106 for transmitting signals to the modulation driving lead wiring through the FPC 105 and a scanning driver circuit 110 for transmitting signals to the scanning wiring, and further a connector 111 for scanning wiring FPC 1001.

Braces 112 secure the circuit board 109 and the support plate 107 in position while maintaining a space between the circuit board 109 and the support plate 107.

Figure 3A:
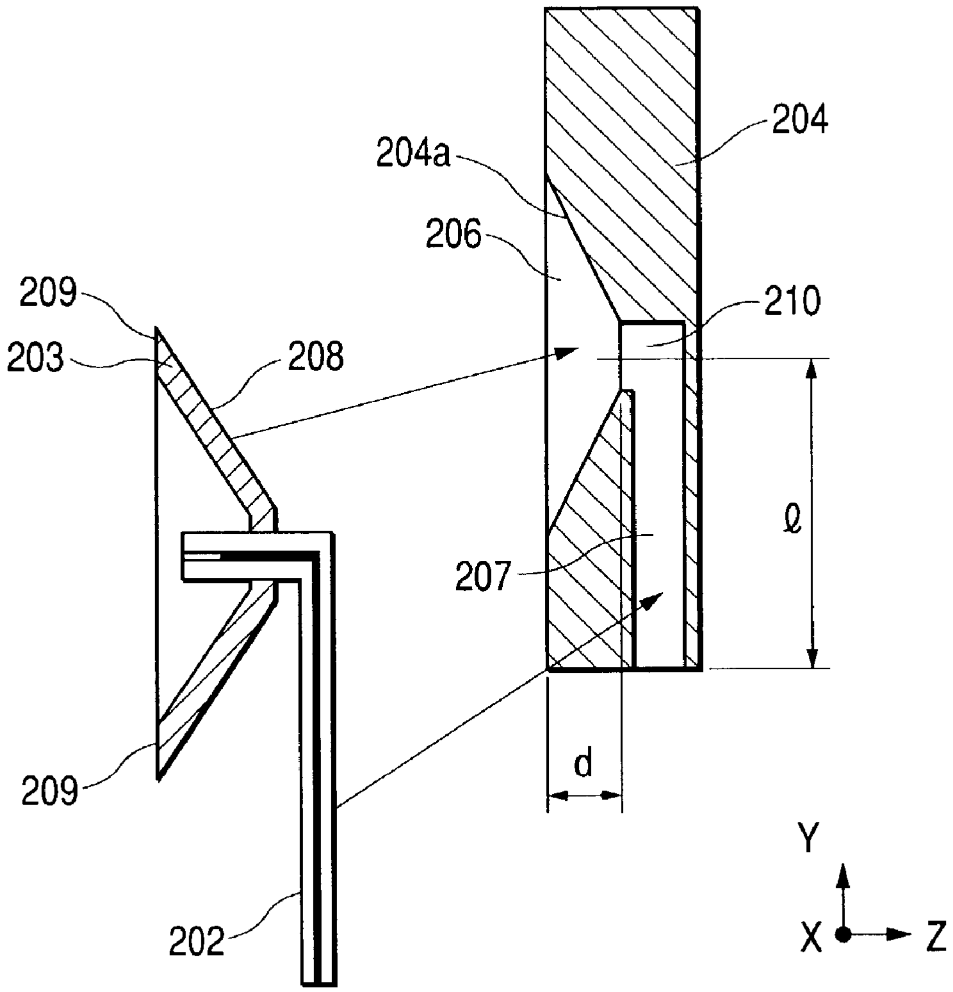
FIG. 3A is a side sectional view of a retaining guide member in the first embodiment of the present invention, with a cap guide removed.

Next, the construction of an insulating cap 203 and a retention guide member 204 and their mounting to the support plate 107, etc. will be described with reference to FIG. 3A, which is a side sectional view of the retention guide member with a cap guide removed, FIGS. 3B and 3C, which show how an anode terminal and a cable are connected, and FIG. 4, which is an enlarged side sectional view of a portion around the retention guide member.

The insulating cap 203, formed as a truncated cone, is obtained by molding of an insulator such as silicone resin, and a commercially available cable 202 having a withstand voltage of 15 kV is attached thereto. Voltage is supplied to a display member of the face plate 101 from a power source 201 connected to one end of the cable 202 through a power supply introduction terminal 104 connected to the other end thereof. The power supply introduction terminal 104 is formed of 426 alloy (42% of Ni, 6% of Cr, the rest consisting of Fe), and is hermetically connected to a hole provided in a corner portion of the rear plate 102.

Examples of the insulating material for the cap of the present invention include, apart from silicone, fluoro rubber, hydrogenated nitrile rubber, acrylic rubber, polystyrene, polyethylene, epichlorohydrin rubber, chloroprene rubber, acrylonitrile butadiene rubber, ethylene-propylene rubber, butyl rubber, and natural rubber.

In performing mounting operation, the conductor portion of the cable 202 with the anode cap 203 attached thereto is first connected to the anode terminal 104 for introducing power supply protruding from the rear surface side of the flat display unit 113 by pushing it in the -Z-direction with the connection end of the cable directed to the anode terminal while deforming the anode cap.

Figure 3B:
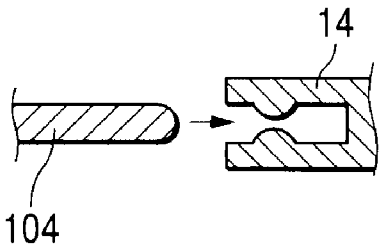
FIGS. 3B and 3C are schematic diagrams illustrating how an anode terminal and a cable are connected to each other.
Figure 3C:
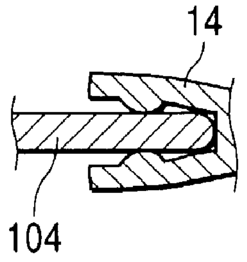
Figure 4:
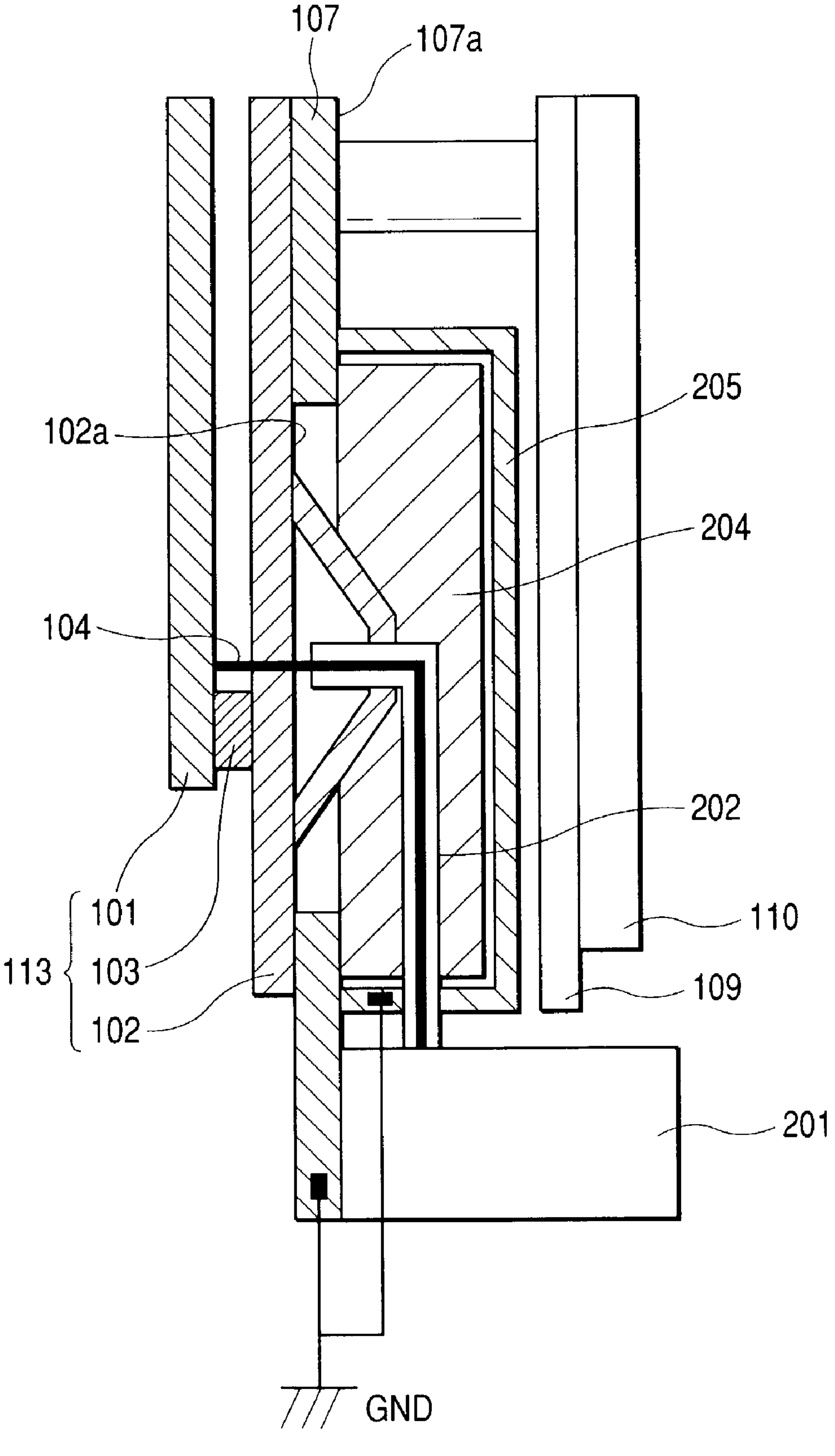
FIG. 4 is an enlarged side sectional view of the portion around a retaining guide member of the first embodiment of the present invention.

FIG. 3B shows the state before connection of the anode terminal, and FIG. 3C shows the state after connection of the same. As shown in these drawings, the forward end portion of the anode terminal 104 is held between protrusions on the inner surface of a recess provided at the forward end of the conductor 14 of the cable 202 and is thereby secured in position.

Next, the retention guide member 204 consisting of an insulating material such as polycarbonate is pushed in the -Z-direction to be thereby mounted to the anode cap.

Then, the retention guide member 204 is fixed to the rear surface side 107*a* of the support plate 107 by a fastening member such as a screw (not shown).

The retention guide member 204 serves as both a retaining member for regulating the position of the insulating cap 203 in the XY in-plane directions and in the Z-direction and a guide for regulating the lead-out direction of the cable 202. In order to retain the insulating cap 203 while regulating its position in the XY in-plane directions and in the Z-direction, the cap guide 206 of the retention guide member 204 is formed in a configuration in conformity with the retaining surface 208 of the insulating cap 203, whereby the retaining surface 208 of the insulating cap 203 is held in close contact with the cap retaining surface 204*a* of the retention guide member 204.

The retention guide member 204 is fixed to the rear surface side 107*a* of the support plate 107 by a screw (not shown), so that the insulating cap 203 is immovable with respect to the support plate 107. By fixing the retention guide member 204 to the support plate 107, the abutting surface 209 of the insulating cap 203 is pressed against the rear surface side 102*a* of the rear plate 102. By varying the depth d of the cap guide 206, it is possible to control the pressurizing force for the insulating cap 203 with respect to the rear plate 102. That is, when the pressurizing force is to be reduced, the depth d is increased; when the pressurizing force is to be increased, the depth d is reduced. The pressurizing force can also be controlled by providing a spacer between the retention guide member 204 and the support plate 107. In other words, the cap 203 is urged toward the rear plate 102 (mechanically biased) by the retention guide member 204.

The cable guide 207 has a bending portion 210 for turning the cable 202, which is extracted in the Z-direction from the power supply introduction terminal 104, from the Z-direction to the -Y direction into a reversed L-shape. Further, this cable guide 207 guides the cable 202 over a length l, so that no excessive force is applied to the power supply introduction terminal 104. For example, in the case of a construction in which the cable 202 is supported at one point, if a force is applied using the side of the cable 202 connected to the power source 201 as the power point to cause to it to be displaced greatly, the power supply introduction terminal 104 constituting the point of action is greatly displaced in the direction opposite to the direction in which the power point side has displaced, using the point supporting the cable 202 as the fulcrum, with the result that an excessive force is applied to the power supply introduction terminal 104. In the case of this embodiment, however, the cable 202 is fixed at the portion of the cable guide 207 of the length l, so that even if the portion of the cable 202 connected to the power source 201 is greatly displaced, the portion thereof connected to the power supply introduction terminal 104 does not move. Thus, no excessive force is applied to the power supply introduction terminal 104.

In this way, on the rear surface side of the display unit 113, there is provided an anode terminal connecting portion including the anode cap 203 consisting of an insulator and adapted to cover the anode terminal 104, and the cable 202 to which the anode cap 203 is attached and which has the conductor 14 connected to the anode terminal 104. Further, provided on the frame 107 is the regulating member (retention guide member) 204 for regulating the movement of the anode terminal connecting portion. Thus, the movement of the anode terminal connecting portion is regulated, making it possible to prevent failure from occurring in the terminal connecting portion.

For retaining purpose, the material for the retaining member of the present invention is preferably one that is more rigid than the cap. More specifically, it may be obtained by selecting one of the materials that can be used for the cap described above and shaping it into an appropriate configuration for higher rigidity. It can also be appropriately selected from organic insulators such as polycarbonate, glass epoxy, and acrylic resin, or inorganic insulators such as alumina and ceramics. Further, it is also possible to use a conductive material such as metal as in the embodiment described below. Alternatively, it may be a combination of a conductive material and an insulating material.

The retention guide member 204 fixed to the support plate 107 electrically connected to the GND (ground) of the display device 1 is conductive and is surrounded by a conductive cover 205 connected to the GND of the display device 1. That is, the power supply introduction terminal 104 is covered with the conductive cover 205 to which a potential lower than the acceleration potential is imparted. The cover 205 is made of a metal plate or a plate coated with a metal film.

Figure 5:
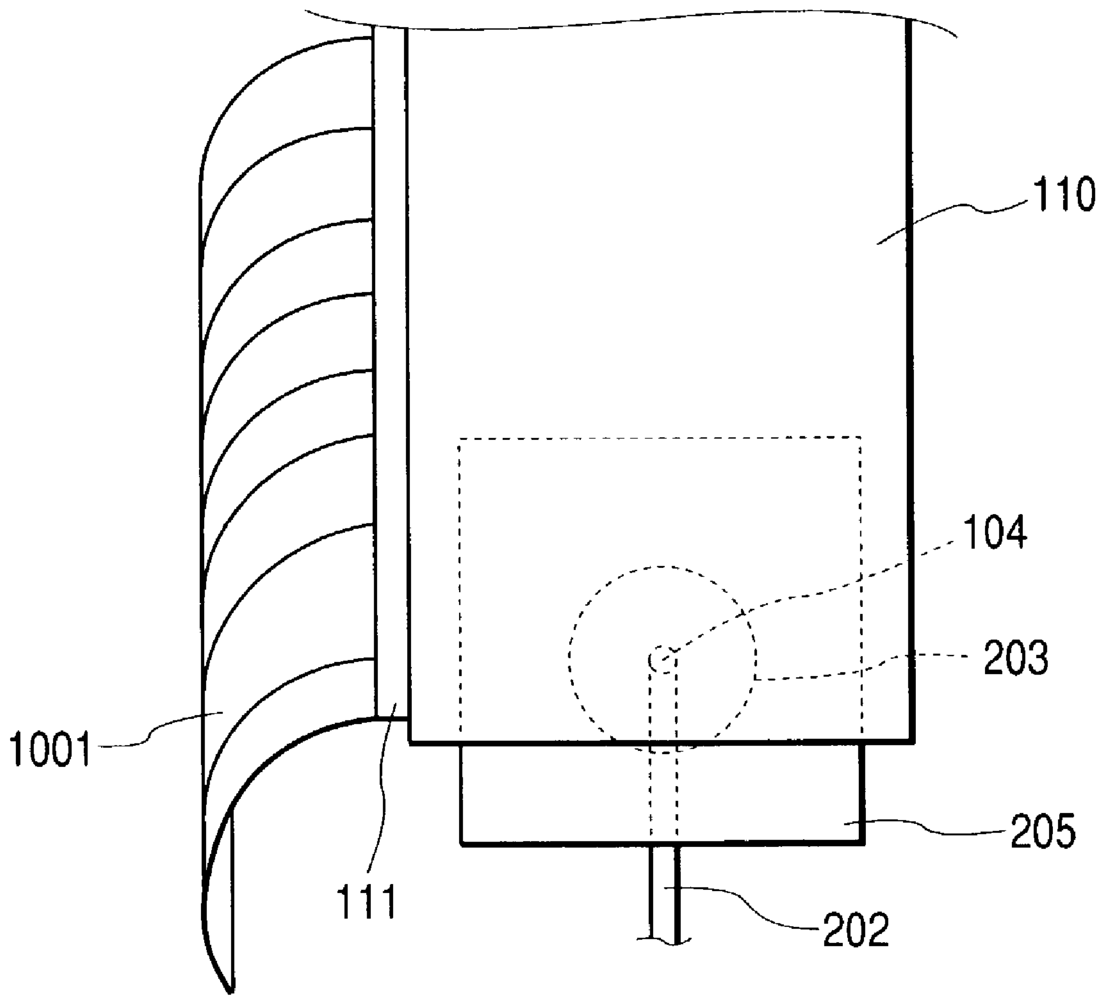
FIG. 5 is a partially perspective view of the portion around an insulating cap and a conductor cover as seen from the direction of arrow S of FIG. 2.

Next, FIG. 5 is a partially perspective view of a portion in the vicinity of the insulating cap and the conductive cover as seen from the direction of arrow S in FIG. 2.

In this arrangement, the orthogonal projection of the scanning driver circuit 110 overlaps the power supply introduction terminal 104. Between the power supply introduction terminal 104 and the scanning driver circuit 110, there exist the insulating cap 203 covering the power supply introduction cap 104 and the conductive cover 205 electrically connected to the GND, so that it is possible to restrain potential leakage from the insulating cap 203, the retention guide member 204, etc. Thus, the potential of the power supply introduction terminal 104 does not adversely affect the electric circuits such as the scanning driver circuit 110 electrically.

The arrangement of this embodiment, described above, provides the following advantages:

(1) By covering the components around the power supply introduction terminal 104 such as the insulating cap 203 and the retention guide member 204 with the conductive cover 205, it is possible to arrange the circuit board 109 on which the scanning driver circuit 110, the modulation driver circuit 106, etc. are mounted at a position directly above and very close (several mm) to the retention guide member 204. In the driver circuit on which an IC circuit with low discharge withstand voltage is mounted, the members in the periphery of the voltage introduction terminal 104 to which high voltage is supplied, such as the insulating cap 203 and the retention guide member 204, have high potential. However, by covering them with the conductive cover 205, it is possible to regulate the potential. By connecting this potential to the GND (=the GND of the electric circuit) of the display device 1, it is possible to restrain potential leakage from the insulating cap 203, the retention guide member 204, etc., thereby increasing the degree of freedom regarding the arrangement of the circuit board 109. This makes it possible to achieve a reduction in the thickness of the display device 1.

(2) By fixing the retention guide member 204 to the support plate 107, it is possible to make the insulating cap 203 immovable with respect to the support plate 107, thereby providing a structure which proves effective against external forces due to vibration, shock, etc. during transportation. That is, in the case in which the retention guide member 204 is fixed to the display unit 113, the thickness of the display unit 113 must be increased before a structure effective against external forces can be obtained, which means there is no avoiding an increase in the thickness of the display device 1. In contrast, in the case of this embodiment, there is no need to increase the thickness of the display unit 113, so that it is possible to achieve a reduction in the thickness of the display device 1.

(3) By arranging the retention guide member 204 with the cable guide 207 formed therein, it is possible to change the routing direction of the cable freely and safely according to the arrangement of the power source 201, thus allowing the cable to be freely routed.

Second Embodiment

Figure 6:
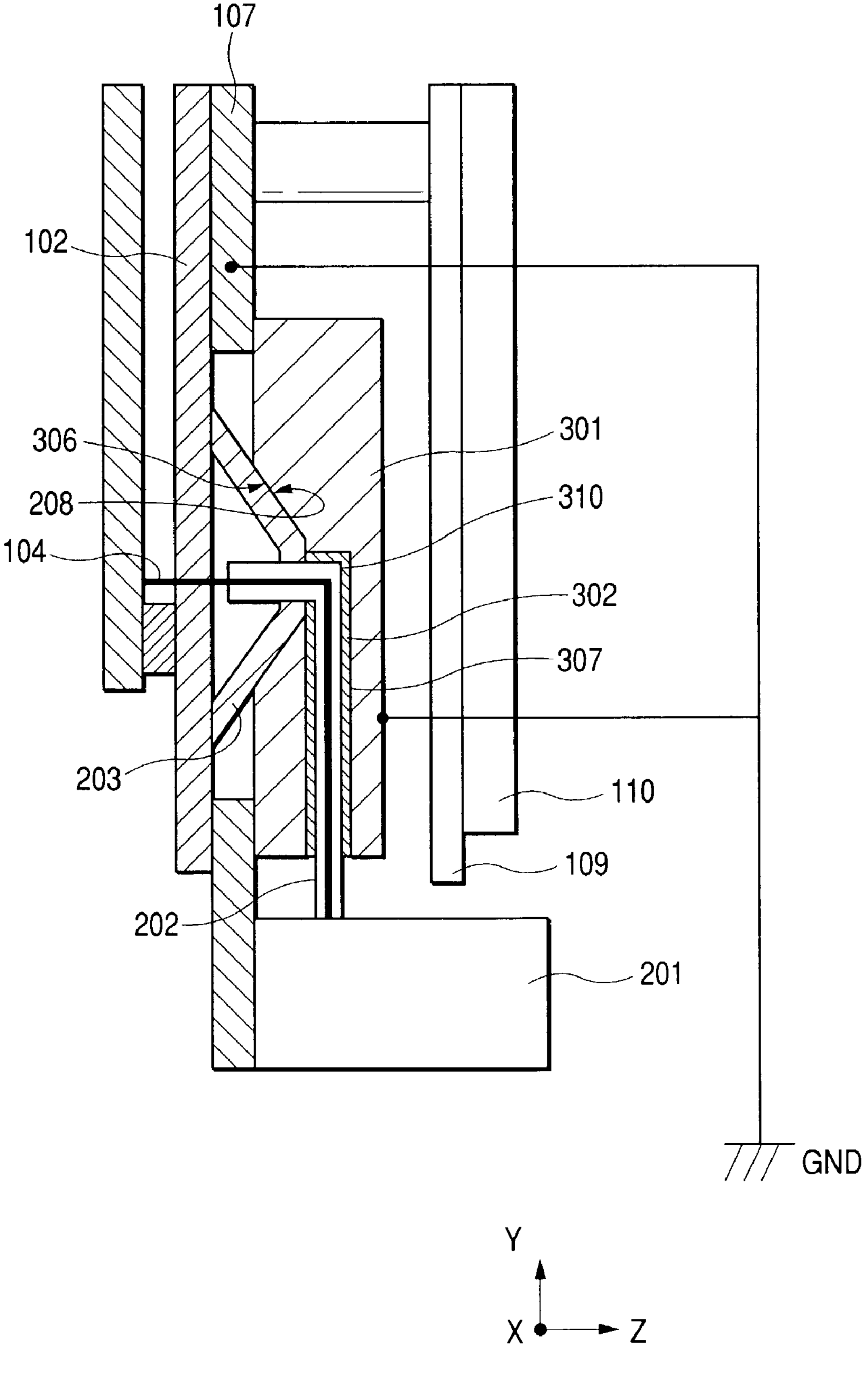
FIG. 6 is an enlarged side sectional view of the portion around a conductor retaining guide member of a second embodiment of the present invention.

FIG. 6 is an enlarged side sectional view of the portion of the display device of this embodiment in the vicinity of the conductor retention guide member.

In the following, a description of the components which are the same as those of the first embodiment will be omitted, with the exception of a conductor retention guide member 301. Further, the components which are the same as those of the first embodiment are indicated by the same reference numerals.

The conductor retention guide member 301 serves as the potential defining conductor situated between the insulating cap 203 covering the power supply introduction terminal 104 and the electric circuits including the scanning driver circuit 110, the retaining portion for the insulating cap 203, and the cable guide for guiding the cable 202. This member 301 is formed by performing machining on a metal conductive material, such as aluminum, stainless steel, and copper.

Like the cap guide 206 of the first embodiment, the cap guide 306 serves as both the retaining member for regulating the position of the insulating cap 203 in the XY in-plane directions and the Z-direction and the guide for regulating the lead-out direction of the cable 202. In order to retain the insulating cap 203 while regulating its position in the XY in-plane directions and the Z-direction, the cap guide 306 of the conductor retention guide member 301 is formed in a configuration in conformity with the retaining surface 208 of the insulating cap 203.

Further, in order that the cable 202 may not be damaged by burrs generated during the machining of the conductor retention guide member 301 consisting of aluminum, it is desirable to cover the cable 202 with the insulating covering member 302 as needed.

Like the cable guide 207 of the first embodiment, the cable guide 307 formed in the conductor retention guide member 301 has a bending portion 310 for turning the cable 202, which is extracted in the Z-direction, from the Z-direction to the -Y-direction, and no excessive force is easily applied to the power supply introduction terminal 104.

By fixing the conductor retention guide member 301 to the support plate 107 by means of a screw, it is possible to secure the insulating cap 203 in position. At the same time, the conductor retention guide member 301 is electrically connected to the support plate 107 of aluminum by being joined thereto. Then, the support plate 107 and the conductor retention guide member 301 are electrically connected to the GND of the display device 1, so that, as in the first embodiment, it is possible to restrain potential leakage from the insulating cap 203.

Further, by fixing the conductor retention guide member 301 to the support plate 107, it is possible to make the insulating cap 203 immovable with respect to the support plate 107, and, as in the first embodiment, it is possible to obtain a structure which is effective against external forces due to vibration and shock during transportation without having to increase the thickness of the display unit.

Further, like in the first embodiment, this embodiment adopts a construction in which the conductor retention guide member 301 with the cable guide 307 formed therein is arranged, whereby it is possible to change the cable routing direction freely and safely according to the arrangement of the power source 201, thus allowing the cable to be freely routed.

In this embodiment, due to the arrangement of the conductor retention guide member 301, it is possible to arrange the circuit board 109 with the scanning driver 110, the modulation driver circuit 106, etc. mounted thereon at a position directly above and very close (several mm) to the conductor retention guide member 301. Further, in addition to retaining the insulating cap 203 and serving as the cable guide, the conductor retention guide member 301 also serves as the potential defining conductor, whereby it is possible to achieve a further reduction in the thickness of the display device 1 and to reduce the number of parts, thereby realizing a more inexpensive structure.

An image signal was input to the display device 1 of this embodiment to form an image, whereby it was confirmed that the device could be driven for a long period of time in a stable manner.

Third Embodiment

Figure 7:
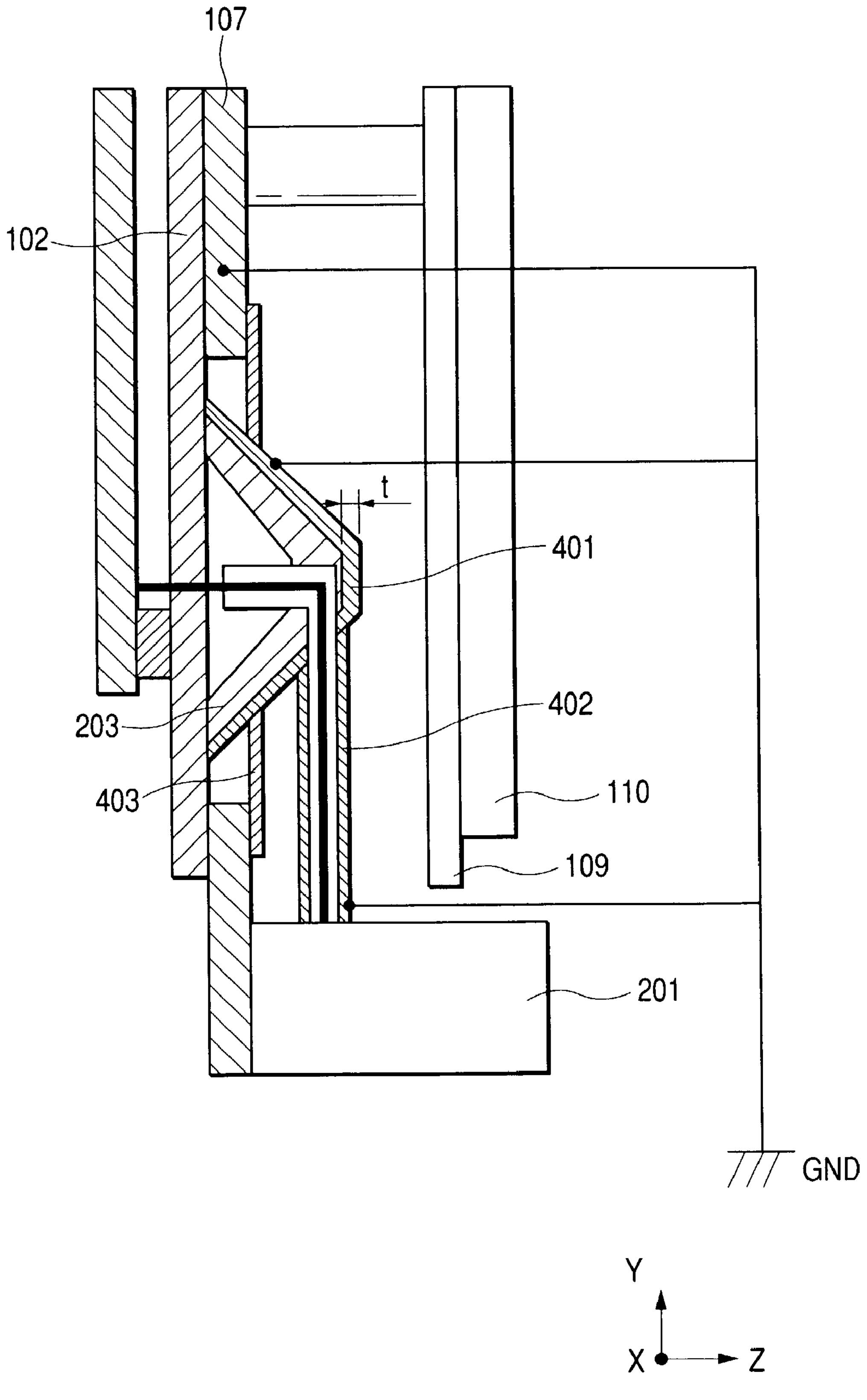
FIG. 7 is an enlarged side sectional view of the portion around a conductor retaining guide member of a third embodiment of the present invention.

FIG. 7 is an enlarged side sectional view of the portion of the display device of this embodiment in the vicinity of the conductor retention guide member.

In the following, the components which are the same as those of the first embodiment are indicated by the same reference numerals, and a description of such components will be omitted.

An insulating cap conductor cover 401 is a conductive rubber member formed in conformity with the outer configuration of the insulating cap 203, and serves as a conductor between the insulating cap 203 and the electric circuits including the scanning driver circuit 110.

A conductive cover member 402 is a conductive tube covering the cable 202.

A retaining member 403 is formed of a conductive and rigid material such as aluminum in such a configuration as will allow the entry of the insulating cap 203 and the insulating cap conductive cover 401; it retains the insulating cap 203 and the conductive cover 401 and regulates their positions such that they do not move in the XY in-plane directions and the Z-direction. The retaining member 403 is mechanically fixed to the support plate 107 by means of a screw 404. Due to this fixation, the retaining member 403 is electrically connected to the aluminum support plate 107. Further, the conductive cover member 402 and the support plate 107 are electrically connected to the GND of the display device 1, so that, as in the first and second embodiments, it is possible to restrain potential leakage from the insulating cap 203.

As in the first and second embodiments, due to the construction of the insulating cap conductive cover 401 and the conductive cover member 402, it is possible to arrange the circuit board 109 with the scanning driver circuit 110, the modulation driver circuit 106, etc. mounted thereon at a position directly above and very close (several mm) to the insulating cap conductive cover 401.

Further, in this embodiment, by fixing the insulating cap conductive cover 401 to the support plate 107 through the intermediation of the retaining member 403, it is possible to make the insulating cap 203 immovable with respect to the support plate 107, and, as in the first and second embodiments, it is possible to realize a structure effective against external forces such as vibration and shock during transportation without having to increase the thickness of the display unit. Since the insulating cap conductive cover 401 is a rubber member, it is possible to reduce the thickness t, thereby achieving a further reduction in the thickness of the display device 1.

Apart from being used as a monitor for the terminal equipment of a television or a computer, the display device 1, 2, 3 of the present invention is suitably applicable to an advertisement display, a sign, and various types of electronic equipment such as a video camera.

As described above, in the display device according to a first aspect of the present invention, there is provided a support structure equipped with a retaining portion for retaining the insulator, whereby it is possible to reliably regulate the position of the insulator with respect to the display unit, making it possible to achieve a reduction in the size and thickness of the entire device.

According to a second aspect of the present invention, there is provided a guide for guiding the conductor cable connecting the terminal and the power source along the conductor cable, whereby deformation of the conductor cable is restrained, and no force with bad effect is applied to the terminal. Further, since it is a guide along the conductor cable, it is also possible to prevent interference of the conductor cable with other components.

According to a third aspect of the present invention, the terminal is covered with an insulator, and there is provided between the insulator and the circuits a conductor to which a potential lower than that supplied to the terminal is supplied, whereby it is possible to mitigate the influence of the terminal potential on the circuits. This allows the terminal and the circuits to overlap each other, thereby increasing the degree of freedom regarding the circuit arrangement.

What is claimed is:

1. A display device equipped with a flat display unit comprising an electron-emitting device, an anode electrode to which an acceleration potential for accelerating electrons emitted from the electron-emitting device is imparted, and a luminous element adapted to emit light in response to receiving the electrons emitted from the electron-emitting device, the display device comprising:

an anode terminal for imparting the acceleration potential to the anode electrode;

an anode cap provided on a rear surface of the display unit and comprising an insulator for covering the anode terminal; and a frame for supporting the display unit, wherein the frame is equipped with a retaining portion for retaining the anode cap independently of the support of the display unit.

2. A display device according to claim 1, wherein the retaining portion is formed as a separate portion detachable from the frame.

3. A display device according to claim 1, wherein the anode terminal protrudes from the rear surface of the display unit.

4. A display device according to claim 1, wherein the retaining portion is provided so as to urge the anode cap toward the display unit.

5. A display device equipped with a display unit for displaying information, comprising:

a terminal connected to the display unit and adapted to supply a predetermined potential to an electrode in the display unit;

an insulator provided outside the display unit and adapted to cover the terminal; and a support structure for supporting the display unit, wherein the support structure is equipped with a retaining portion for retaining the insulator independently of the support of the display unit.

6. A display device equipped with a display unit for displaying information, comprising:

a terminal connected to the display unit and adapted to supply a predetermined potential to an electrode in the display unit;

a power source for generating the predetermined potential to be imparted to the terminal through a conductor cable; and a guide structure for guiding the conductor cable along the conductor cable between the terminal and the power source;

an insulator provided outside the display unit and adapted to cover the terminal; and a support structure for supporting the display unit, wherein the support structure is equipped with a retaining portion for retaining the insulator independently of the support of the display unit.

7. A display device equipped with a flat display unit comprising an electron-emitting device, an anode electrode to which an acceleration potential for accelerating electrons emitted from the electron-emitting device is imparted, and a luminous element adapted to emit light in response to receiving the electrons emitted from the electron-emitting device, the display device comprising:

an anode terminal for imparting the acceleration potential to the anode electrode;

an anode cap provided on a rear surface of the display unit and comprising an insulator for covering the anode terminal; and a drive circuit for outputting a signal for driving the display unit, wherein at least a part of the drive circuit is arranged such that an orthogonal projection of part of the drive circuit on the rear surface of the display unit overlaps at least a part of the anode terminal, and wherein in the portion where the drive circuit and the anode terminal overlap each other, a conductor to which a reference potential lower than the acceleration potential is imparted is provided between the drive circuit and the anode terminal, and the conductor is insulated from each of the drive circuit and the anode terminal.

8. A display device equipped with a display unit for displaying information, comprising:

a terminal connected to the display unit and adapted to supply a predetermined potential to an electrode in the display unit;

an insulator provided outside the display unit and adapted to cover the terminal; and a drive circuit for outputting a signal for driving the display unit, wherein a first portion constituting at least a part of the drive circuit is arranged such that the orthogonal projection of the first portion on a predetermined surface of the display unit overlaps at least a part of the terminal, and wherein in the portion where the drive circuit and the terminal overlap each other, a conductor to which a reference potential lower than the predetermined potential is imparted is provided between the drive circuit and the terminal, and the conductor is insulated from each of the drive circuit and the terminal.

9. A display device according to claim 7, wherein said conductor is a metal plate or a plate coated with a metal film.

10. A display device according to claim 7, wherein said insulator is covered with said conductor.

11. A display device equipped with a flat display unit comprising an electron-emitting device, an anode electrode to which an acceleration potential for accelerating electrons emitted from the electron-emitting device is imparted, and a luminous element adapted to emit light in response to receiving the electrons emitted from the electron-emitting device, the display device comprising:

an anode terminal for imparting the acceleration potential to the anode electrode;

an anode terminal connecting portion including an anode cap provided on the rear surface of the display unit and comprising an insulator for covering the anode terminal, and a cable having a conductor connected to the anode terminal to which the anode cap is attached; and a frame for supporting the display unit, wherein the frame is equipped with a regulating member for regulating the movement of the anode terminal connecting portion.

12. A display device equipped with a flat display unit comprising an electron-emitting device, an anode electrode to which an acceleration potential for accelerating electrons emitted from the electron-emitting device is imparted, and a luminous element adapted to emit light in response to receiving the electrons emitted from the electron-emitting device, the display device comprising:

an anode terminal for imparting the acceleration potential to the anode electrode;

an anode cap provided on a rear surface of the display unit and comprising an insulator for covering the anode terminal; and a drive circuit for outputting a signal for driving the display unit, wherein at least part of the drive circuit is arranged such that orthogonal projection of the part on the rear surface of the display unit overlaps at least a part of the anode terminal, and wherein in the portion where the drive circuit and the anode terminal overlap each other, a conductor to which a reference potential lower than the acceleration potential is imparted is provided between at least the part of the drive circuit and at least the part of the anode terminal.

13. The display device according to claim 12, wherein the conductor comprises a metal plate.

* * * * *